United States Patent [19]
Lundberg et al.

[11] Patent Number: 5,761,534
[45] Date of Patent: Jun. 2, 1998

[54] SYSTEM FOR ARBITRATING PACKETIZED DATA FROM THE NETWORK TO THE PERIPHERAL RESOURCES AND PRIORITIZING THE DISPATCHING OF PACKETS ONTO THE NETWORK

[75] Inventors: Eric P. Lundberg, Eau Claire; Joseph M. Placek, Chippewa Falls, both of Wis.

[73] Assignee: Cray Research, Inc., Eagan, Minn.

[21] Appl. No.: 650,630

[22] Filed: May 20, 1996

[51] Int. Cl.⁶ .................................................. G06F 13/00
[52] U.S. Cl. ............... 395/870; 340/822.5; 340/286.02; 340/307; 370/431; 370/437; 395/860; 395/822; 395/200.69; 395/200.79; 395/728
[58] Field of Search ................ 340/825.5; 370/400, 370/389, 235; 395/860, 856, 200.79, 822, 200.69, 842

[56] References Cited

U.S. PATENT DOCUMENTS

| | | | |
|---|---|---|---|
| 4,739,321 | 4/1988 | Friedman et al. | 340/825.5 |
| 4,901,234 | 2/1990 | Heath et al. | 395/860 |
| 5,107,493 | 4/1992 | Eng et al. | 370/400 |
| 5,195,100 | 3/1993 | Katz et al. | 371/66 |
| 5,233,618 | 8/1993 | Glider et al. | 371/68.1 |
| 5,265,235 | 11/1993 | Sindhu et al. | 701/120 |
| 5,274,799 | 12/1993 | Brant et al. | 395/575 |
| 5,287,535 | 2/1994 | Sakawaga et al. | 370/389 |
| 5,303,244 | 4/1994 | Watson | 371/10.1 |
| 5,345,565 | 9/1994 | Jibbe et al. | 395/325 |
| 5,388,217 | 2/1995 | Benzschawel et al. | 395/856 |
| 5,402,428 | 3/1995 | Kakuta et al. | 371/10.1 |
| 5,404,353 | 4/1995 | Ben-Michael et al. | 370/235 |
| 5,452,444 | 9/1995 | Solomon et al. | 395/182.04 |
| 5,499,337 | 3/1996 | Gordon | 395/182.04 |
| 5,513,192 | 4/1996 | Janku et al. | 371/50.1 |
| 5,519,844 | 5/1996 | Stallmo | 395/441 |
| 5,522,031 | 5/1996 | Ellis et al. | 395/182.04 |
| 5,530,808 | 6/1996 | Hammond et al. | 395/200.79 |
| 5,530,948 | 6/1996 | Islan | 395/182.04 |
| 5,619,722 | 4/1997 | Lovernich | 395/822 |
| 5,638,516 | 6/1997 | Duzett et al. | 395/200.69 |
| 5,655,151 | 8/1997 | Bowes et al. | 395/842 |

OTHER PUBLICATIONS

Gustavson, D B, "The Scalable Coherent Interface and Related Standards Projects", *IEEE Micro*, 10–22, (Feb., 1992).

"IEEE Standard for Scalable Coherent Interface (SCI)", *IEEE Std 1596-1992*, 1–248, (Mar., 1992).

Patterson, D A, et al., "A Case For Redundant Arrays Of Inexpensive Disks (RAID)", *University of California at Berkeley, Report No. UCB/CSD 87/391*, (Dec. 1987).

Scott, S. "The SCX Channel: A New, Supercomputer-Class System Interconnect", *HOT Interconnects III*, Abstract, pp. 1–11, (Aug. 1–11, 1995).

*Primary Examiner*—Thomas C. Lee
*Assistant Examiner*—Thuy Pardo
*Attorney, Agent, or Firm*—Schwegman, Lundberg, Woessner & Kluth, P.A.

[57] ABSTRACT

A client interface supporting a plurality of peripheral channels and a network channel. The peripheral channels include a maintenance channel, message input channel, message output channel, express channel and several DMA channels. The client interface routes packets from the network to the peripheral resources and prioritizes the dispatching of packets onto the network. Express packets and message packets are given priority over DMA type packets. Priority to dispatch is rotated among the DMA channels.

4 Claims, 6 Drawing Sheets

SYSTEM FOR ARBITRATING PACKETIZED DATA FROM THE NETWORK TO THE PERIPHERAL RESOURCES AND PRIORITIZING THE DISPATCHING OF PACKETS ONTO THE NETWORK

STATEMENT REGARDING GOVERNMENT RIGHTS

The present invention was made with government support under MDA 972-95-3-0032, awarded by ARPA. The Government has certain rights in this invention.

FIELD OF THE INVENTION

The present invention relates to computer systems and in particular to DMA control within computer systems.

BACKGROUND

Packet switching is a method of transmitting messages through a communication network by subdividing long messages into short packets, each containing a destination address. These packets travel to their destination through intermediate communication nodes. At each node, the packet is received and passed on to the next node.

Once the packet reaches its destination node, it must be removed from the communications network and must be routed to the appropriate location at that node. In some situations, there may be a large number of such distinct locations to which the packet could be routed.

Likewise, data may have to be written from one of the locations on the node to the network. In such a situation, packets from the multiple locations may compete with one another to be dispatched to the network. Therefore, outgoing packets must be prioritized and port arbitration must fairly determine ordering of the packets. There is a need in the art for a method of determining the priority of packets efficiently so that the packet dispatch rate is not compromised.

SUMMARY OF THE INVENTION

The present invention provides a mechanism for routing packets between a node connection of a computer network and the client node. Packets are taken from the network and the packet routing logic interprets the packet's header, directing the packet to one of a plurality of channels, including a plurality of DMA channels, a maintenance channel, an express channel for very small data payloads, and message channels. Outgoing packets from the channels are prioritized, with non DMA-channel packets given the highest priority. DMA-channel packets are managed by a port arbitration system to ensure that each DMA channel is allocated a fair share of bandwidth.

DETAILED DESCRIPTION

In the following Detailed Description, reference is made to the accompanying drawings which form a part hereof and in which is shown by way of illustration specific embodiments in which the invention may be practiced. These embodiments are described in sufficient detail to enable those skilled in the art to practice and to use the invention, and it is to be understood that other embodiments may be utilized and that changes may be made without departing from the spirit and scope of the present invention. The following Detailed Description is, therefore, not to be taken in a limiting sense and the scope of the invention is defined by the appended claims. In the figures, elements having the same number perform essentially the same functions.

Figure 1:
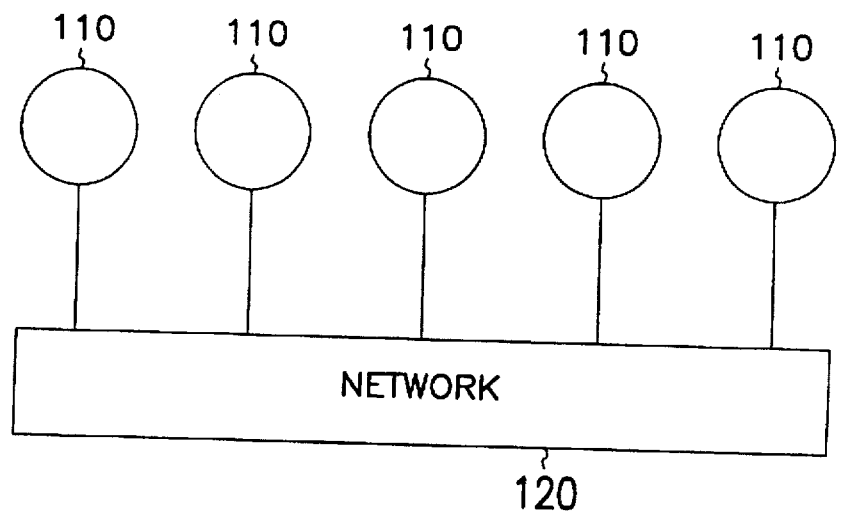
FIG. 1 is a block diagram of a plurality of client devices connected across a network.
Figure 2:
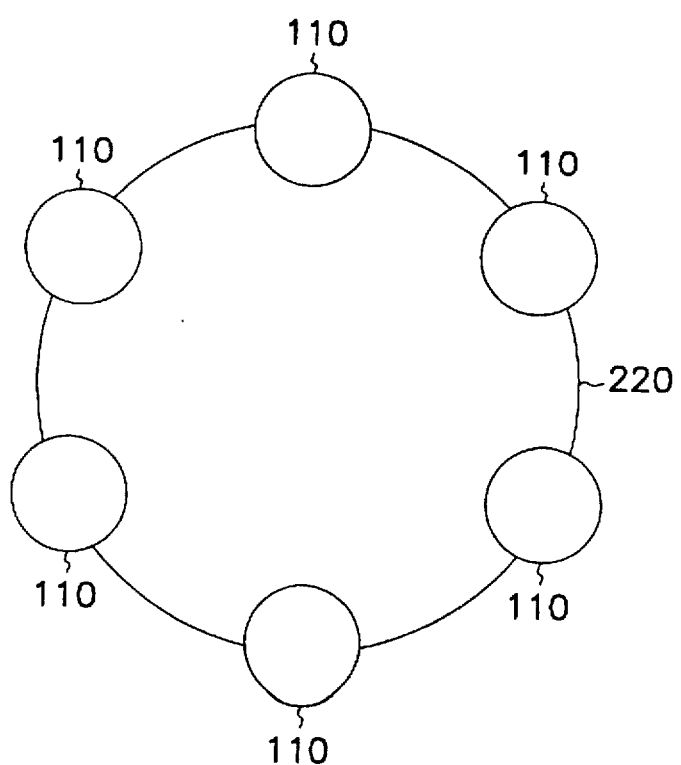
FIG. 2 is a block diagram of a ring network topology which could be used for the network in the system of FIG. 1.

FIG. 1 is a block diagram showing a plurality of client nodes 110 connected across network 120. Network 120 could be configured in several ways. FIG. 2 illustrates one such network, a ring topology. In FIG. 2, a plurality of client nodes 110 are connected to form a ring by communication line 220.

Figure 3:
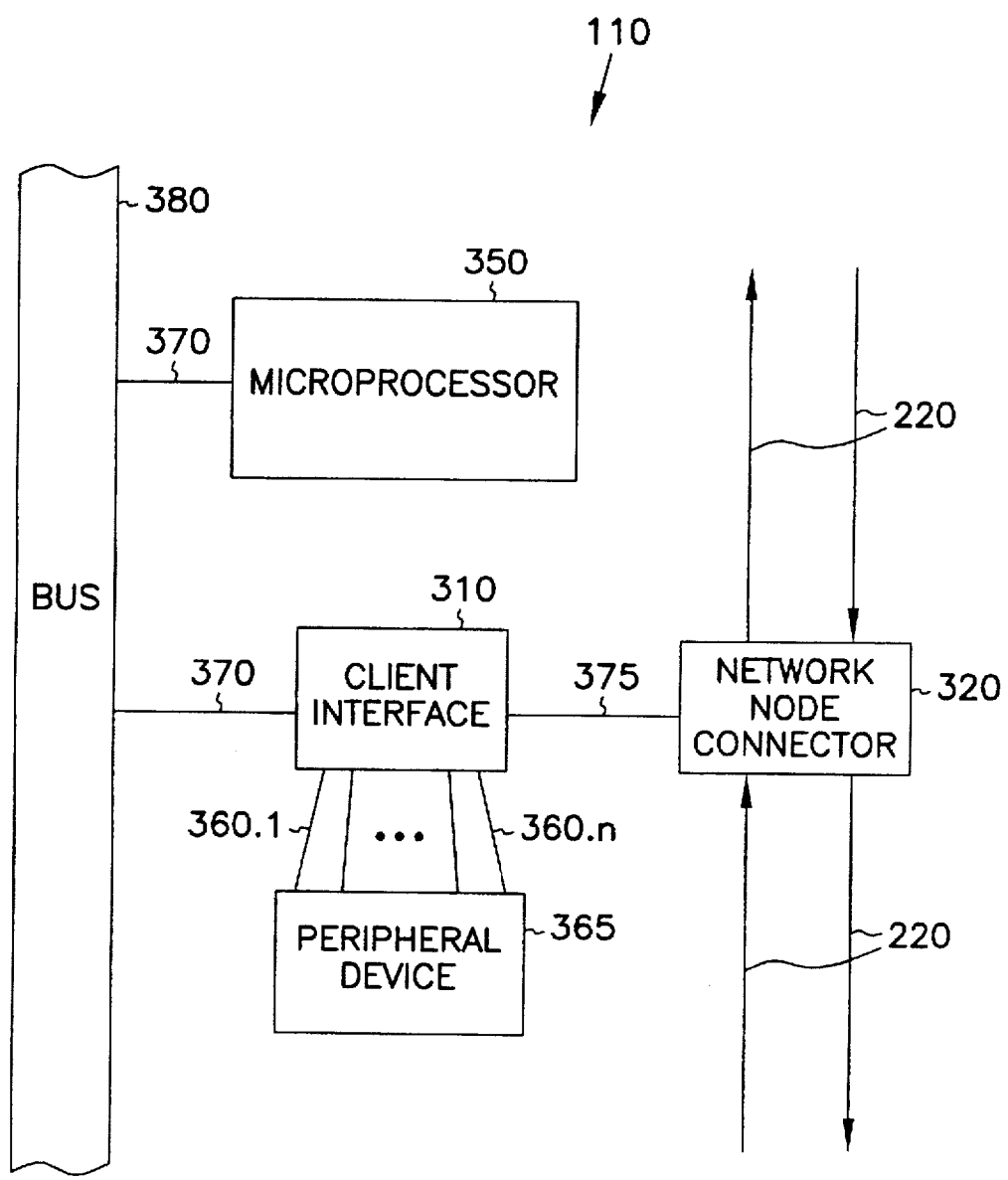
FIG. 3 shows the block diagram of one embodiment of the client interface illustrating the client interface directing the exchange of packets between the network and peripheral devices.

FIG. 3 is a more detailed block diagram of one embodiment of the client node 110 shown in FIGS. 1 and 2. In this embodiment, client node 110 includes client interface 310, microprocessor 350, network node connector 320 and peripheral device 365. Client interface 310 is connected to peripheral device 365 by several peripheral channels 360.1 through 360.n. In one embodiment, peripheral device 365 could be an array of disk drives. In another embodiment, peripheral device 365 could be a general purpose computer. Client interface 310 and microprocessor 350 are both connected via communication line 370 to network bus 380. Client interface 310 is controlled by microprocessor 350. In one embodiment, microprocessor 350 is a microSPARC, available from Sun Systems, Palo Alto, Calif.

Client interface 310 is connected to network node connector 320, by network communication line 375. Network node connector 320 is also connected to network 120 (by, e.g., communication line 220, as shown in FIG. 2). Such a network is described in "RECONFIGURABLE RING-BASED NETWORK SYSTEM," U.S. patent application Ser. No. 08/614,860, still pending, filed Mar. 13, 1996 filed herewith, the description of which is hereby incorporated by reference. The peripheral channel described in U.S. patent application Ser. No. 08/614,860 circulates packets around its dual-ring network.

Figure 4:
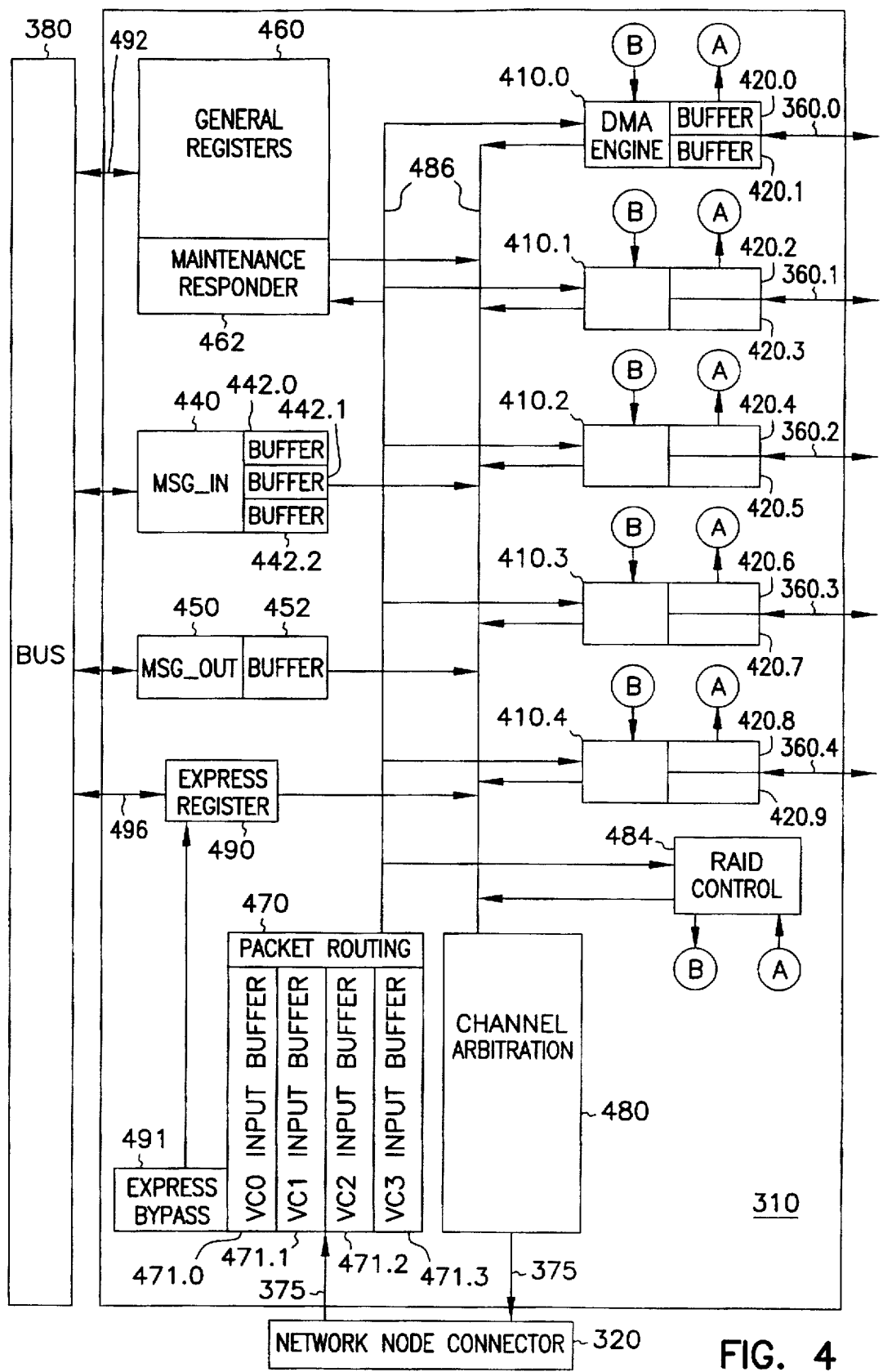
FIG. 4 is a more detailed block diagram of one embodiment of the client interface, having a plurality of input/output channels, memory registers, buffers associated with the channels and packet routing and port arbitration modules.

One embodiment of client interface 310 is shown, in more detail, by FIG. 4. In this embodiment, five peripheral DMA channels are implemented: DMA channel 0 360.0, DMA Channel 1 360.1, DMA channel 2 360.2, DMA channel 3 360.3 and DMA channel 4 360.4. In one such embodiment, each DMA channel 360 operates half-duplex at a burst rate of 200 Mb/s and is managed by a DMA engine 410.0 through 410.4. Ten DMA buffer registers 420.0 through 420.9 are associated with DMA channels 360; each DMA channel 360 is connected to two DMA buffer registers 420. (DMA buffer registers 420 are paired for performance considerations. Only one of the paired DMA buffer registers 420 may be actively transferring data to/from each DMA channel 360. During transmission or reception, the non-active buffer register of each pair can be programmed.)

In one embodiment, client interface 310 can be implemented to optionally support a RAID (Redundant Array of Inexpensive Disk) storage system by including RAID control block 484 within client interface 310. When operating in RAID mode, all of the DMA engines operate in unison. Data passes into and out of RAID control block 484 instead of normal data path 486. RAID control block 484 splits the data on a 64-bit word basis among DMA engines 410.0 through 410.4. Data coming from DMA engines 410.0 through 410.4 is recombined for transmission to network communication line 375 by network node connector 320.

Client interface 310 also has: msg_in register 440, which is used to send packets to microprocessor 350. Msg_in register 440 has enough storage for three packets in buffers 442.0, 442.1 and 442.2; msg_out register 450, which receives packets from microprocessor 350 and which has a single storage buffer 452; express register 490 which is fed data by express bypass 491; general registers 460; port arbitration block 480; and packet routing logic 470 which is associated to virtual input channels 471.0 through 471.3. Associated with general registers 460 is maintenance responder 462, which is a block of logic that responds to maintenance packets. In one embodiment, data movement between client interface 310 and network bus 380 is performed at a rate of at least 10 Mb/s. Express channel 496 carries packets with data payloads of only 0 or 1 word between express register 490 and network bus 380. Packets carried by express channel 496 pre-empt packets carried on any other channel. Maintenance channel 492 carries maintenance-type packets to network bus 380.

General Register Operation

In one embodiment of the present invention, client interface 310 has 11 general registers 460.1 through 460.11. These registers are:

| FIG. 4 label | Register Address* | Access | Width | General Register Description |
|---|---|---|---|---|
| 460.1 | ba + 0 | read | 32 | Client_ID, IC type & revision |
| 460.2 | ba + 4 | read & write | 6 | RAID-3 configuration |
| 460.3 | ba + 8 | read & write | 17 | Interrupt mask, selects interrupt types |
| 460.4 | ba + C | read | 17 | Interrupt status |
| 460.5 | ba + 10 | read & write | 18 | PKT, congestion control |
| 460.6 | ba + 14 | read & write | 32 | FLOW, congestion control |
| 460.7 | ba + 18 | read & write | 32 | Client_info, bits 32–63 |
| 460.8 | ba + 1C | read & write | 32 | Client_info, bits 0–31 |
| 460.9 | ba + 20 | read & write | 5 | Force packet buffer parity error, enable message echoes |
| 460.10 | ba + 24 | read | 8 | Parity error status |
| 460.11 | ba + 28 | write | n/a | Clear parity error status |

*ba = base address = 48000000 Hex (a) RAID 3 Configuration Register

Bit 15 of RAID-3 Configuration General Register 460.2 causes the client interface to operate in striped mode for RAID-3 disk controller operation. RAID-3 is a disk I/O protocol which increases disk performance and fault tolerance. RAID-3 stands for "Redundant Array of Inexpensive Disks, Level 3." If bit 15 of this general register is set, bits 0-4 are used as a stripe mask. Bits 0-4 are unused if bit 15 is clear, indicating no striping. If in striping mode, bit 0 enables stripe 0, bit 1 stripe 1, and so forth with bit 4 enabling stripe 4, which is the parity stripe. Stripe 0 data is sent to DMA channel 0 360.0, stripe 1 to DMA channel 1 360.1, and so forth. In striped operation, either four or five of the stripe enable bits must be set. If four are set, data is reconstructed from the four streams during target write operations mastered by client interface 310 and during slave reads with the client interface 310 operating as a slave.

While RAID-3 operation is enabled, all DMA programming is done through DMA engine 0 410.0. Changes to the RAID-3 configuration register can occur only when all direct memory access is inactive. One embodiment of a RAID system is described in RAID STRIPING ON A SINGLE FIBRE CHANNEL ARBITRATED LOOP, U.S. patent application Ser. No. 08/650,632, still pending, filed May 20, 1996 herewith, the details of which are incorporated by reference. The serial RAID-3 striping application describes how to connect an array of disk drives serially so that only a single channel is needed to stripe data to the array.

(b) Interrupt Mask Register

Interrupt mask register 460.3 is used to enable or disable particular interrupts from propagating to microprocessor 350. A "1" in the interrupt mask bit position enables the corresponding interrupt type. Interrupt status register 460.3 is not affected by the contents of the interrupt mask. The interrupt types available in one embodiment of the current invention are:

| Bit | Interrupt Type |
|---|---|
| 0 | Error |
| 1 | Message input channel 0 |
| 2 | Message input channel 1 |
| 3 | Message input channel 2 |
| 4 | Message output channel |
| 5 | Channel 0 even channel (DMA buffer 0) |
| 6 | Channel 0 odd channel (DMA buffer 1) |
| 7 | Channel 1 even channel (DMA buffer 2) |
| 8 | Channel 1 odd channel (DMA buffer 3) |
| 9 | Channel 2 even channel (DMA buffer 4) |
| 10 | Channel 2 odd channel (DMA buffer 5) |
| 11 | Channel 3 even channel (DMA buffer 6) |
| 12 | Channel 3 odd channel (DMA buffer 7) |
| 13 | Channel 4 even channel (DMA buffer 8) |
| 14 | Channel 4 odd channel (DMA buffer 9) |
| 15 | Express output |
| 16 | Express input |

(c) Force Packet Buffer Parity Error Register

Force Packet Buffer Parity Error Register 460.8 is used in diagnostic mode to inject a parity error into msg_in register 440, msg_out register 450, or express register 490. A write to this register with one of bits 0, 1, 2, or 3 set will set the corresponding bit in the parity error register. This bit will cause parity to be reversed. Bit 0 of this register forces a parity error for the parity bit associated with data bits 0–15. Bit 1 of this register forces a parity error for the parity bit associated with data bits 16–31. Bit 2 does the same for data bits 32–47 and bit 3 does it for data bits 48–63. These buffers use parcel parity. Once the register is set, all writes to these buffers will have the parity bits toggled. When diagnostics are complete, the register must be cleared by software. Because only packet buffers have parity, writes to registers are not affected.

Setting bit 4 of this register enables client echoes to be routed to msg_in 440 if the sequence number indicates the echo should be routed to it. If bit 4 is not set, then client echoes headed for msg_in 440 are discarded. Power-on and resets clear bit 4.

(d) Parity Error Status Register

Parity error status register 460.10 holds parity error flags from RAID-3 data and from maintenance register 494 input data. Any bit set in this register will set the error interrupt.

(e) Clear Parity Error Status Register

Clear Parity Error Status Register 460.11 is used to clear Parity Error Status Register 460.10. A write with bit 0 set will clear bits 7-0 of Parity Error Status Register 460.10.

Message Input Channel

Msg_in register 440 is used for a variety of packet types, but reception of messages is its primary use during system operation. All received messages are routed into msg_in register 440 as well as MMR read response packets, maintenance read response packets, MMR write response packets, maintenance write response packets, block init packets, block done packets, corrupt packets, and unexpected packets. Msg_in register 440 is associated with three packet buffers: message input buffer 0 (MIC0) 442.0, input buffer 1 (MIC1) 442.1 and buffer 2 (MIC2) 442.2. Each of the three message input channel buffers have six memory registers within the msg_in control logic 440. These registers are:

| MIC0 Address | MIC1 Address | MIC2 Address | Access | Description |
|---|---|---|---|---|
| ba + 200 | ba + 400 | ba + 600 | r | read & clear flags |
| ba + 2f0 | ba + 4f0 | ba + 6f0 | r/w | header symbol 0 |
| ba + 2f4 | ba + 4f4 | ba + 6f4 | r/w | header symbol 1 |
| ba + 2f8 | ba + 4f8 | ba + 6f8 | r/w | header symbol 2 |
| ba + 2fc | ba + 4fc | ba + 6fc | r/w | header symbol 3 |
| ba + 300 – 3fc | ba + 500 – 5fc | ba + 700 – 7fc | r/w | payload symbols 0–63 |

Packets which are routed to message input channel buffers 442.0, 442.1 and 442.2 are stored in rotating order beginning with channel 0. The status register contains three flags, bits 2 and 3 are parity error flags, and bit 1 is the done flag. These three message channels have no busy flags. The error and done flags are cleared when read, and should be read only after all packet information has been copied out. The error flags indicate a parity error occurred as data was copied out. The message input payload symbols cannot be read or written during system operation unless the channel is done. The symbols may be read and written after a message is received or in diagnostic operation when it is known that there are no incoming messages. Clearing the done flag opens the input channel for a new input.

Message Output Channel

Msg_out register 450 is used to send any type of packets. The header field and optional data payload are fully programmable. Reads and writes of the payload must occur one word at a time. Symbols on msg_out register 450 may not be read or written by microprocessor 350 while message output channel 450 is actively sending data. The busy flag sets and the done flag clears upon activation. The busy flag clears and the done flag sets when the packet buffer contents have been copied out and can be rewritten. The flags register contains the busy flag in bit 0, and the done flag in bit 1. The flags register also contains the parity error flags in bits 2 and 3. These parity error flags can set only on a microprocessor read of the header or payload symbols and will not set during normal system operation. The parity error flags are cleared and the busy and done flags are not affected by a read of the flags register. Msg_out register 450 can be cleared and a transfer halted by a write to the flags register. The memory registers associated with msg_out register 450 are:

| Address | Access | Description |
|---|---|---|
| ba + 800 | r/w | Flags Register |
| ba + 804 | r/w | Data payload length, activate on write |
| ba + 8f0 | r/w | header symbol 0 |

-continued

| Address | Access | Description |
|---|---|---|
| ba + 8f4 | r/w | header symbol 1 |
| ba + 8f8 | r/w | header symbol 2 |
| ba + 8fc | r/w | header symbol 3 |
| ba + 900 – 9fc | r/w | payload symbols 0–63 |

Express Channel

Express register 490 is used to send and receive express packets. Express packets have a payload length limited to 0 or 1 words. To send an express packet, the header and payload symbols are written by microprocessor 350 followed by a write to the Start Output Transfer memory register. This activates express channel 496. The channel busy flag sets and done flag clears upon activation. The channel busy flag will clear and the done flag will set after the packet has been sent. If the express packet will generate a response packet, that response packet is returned and stored in the same location as the express output data. Therefore, when an express response packet is pending, express register 490 may not be used to send another request until the response is received. After the response packet is stored, express register 490 will go done and generate an interrupt. Memory registers associated with express register 490 are:

| Address | Access | Description |
|---|---|---|
| ba + c00 | r/w | read output busy (bit 0) and done (bit 1), clear output on write |
| ba + c04 | w | start output transfer, transfer payload symbols if bit 0 set |
| ba + c08 | r | read and clear input flags, bits 3 and 2 parity error, bit 1 done |
| ba + cf0 | r/w | header symbol 0 |
| ba + cf4 | r/w | header symbol 1 |
| ba + cf8 | r/w | header symbol 2 |
| ba + cfc | r/w | header symbol 3 |
| ba + d00 | r/w | payload symbol 0 |
| ba + d0r | r/w | payload symbol 1 |

Packet Routing Module and Input Elastic Buffers

There is a 16 symbol elastic buffer for each virtual input channel 471.0 through 471.3. The purpose of the elastic buffers are to maintain a constant flow of symbols despite the long (greater than 10 clocks) flow control delays. Virtual input channels 471.0 through 471.3 allow packets of different types to pass each other on the physical channel. If packets associated with one kind of transfer become backed up, packets of other types can still flow. The virtual channel a packet uses is determined by bits 15 and 16 of the first header symbol.

Packets which are MMR response, maintenance response, block init, block done, and message type packets are routed to msg_in register 440. Block init response, block done response and data response packets are routed to a particular numbered DMA engine 410.0 through 410.4 based on the packet sequence number. The slave address is used to select the channel buffer path for data request packets. Slave address bits 63-61 select the channel buffer path as follows:

| Slave Address Bits 63–61 | Channel |
|---|---|
| 0 | DMA engine 0 for Buffer 0 410.0 |
| 1 | DMA engine 1 for Buffer 1 410.1 |

| Slave Address Bits 63–61 | Channel |
| --- | --- |
| 2 | DMA engine 2 for Buffer 2 410.2 |
| 3 | DMA engine 3 for Buffer 3 410.3 |
| 4 | DMA engine 4 for Buffer 4 410.4 |
| 5–7 | Msg in buffer 442.0, 442.1 or 442.2 |

Additionally, DMA request packets can be routed to msg_in register 440 based on the slave address. This allows a DMA engine to be programmed to target msg_in register 440 when mastering DMA transfers. This mode is used for diagnostic purposes.

Packet Priority Module

Port Arbitration module 480 ensures packets to be transmitted are sent to network node connector 320 in a prioritized order. Non-DMA packets (maintenance responses and message packets) receive the highest priority. DMA packets, from the 5 DMA channels 410.0 through 410.4, have the lowest priority. These DMA packets are transmitted on a rotating priority to ensure fair bandwidth allocation.

Figure 5A:
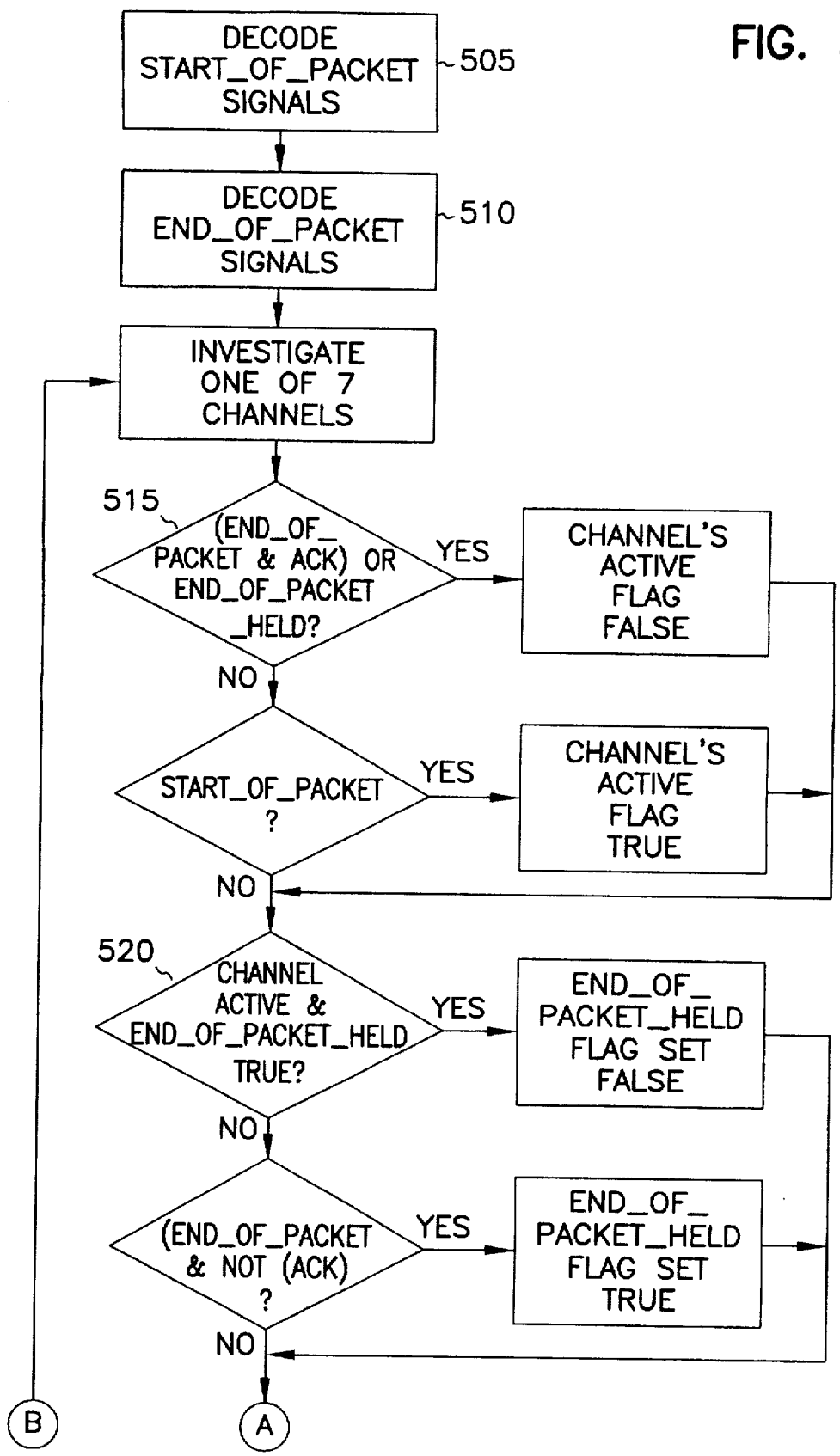
FIGS. 5a, 5b and 5c is a flowchart of one embodiment of the port arbitration module.
Figure 5B:
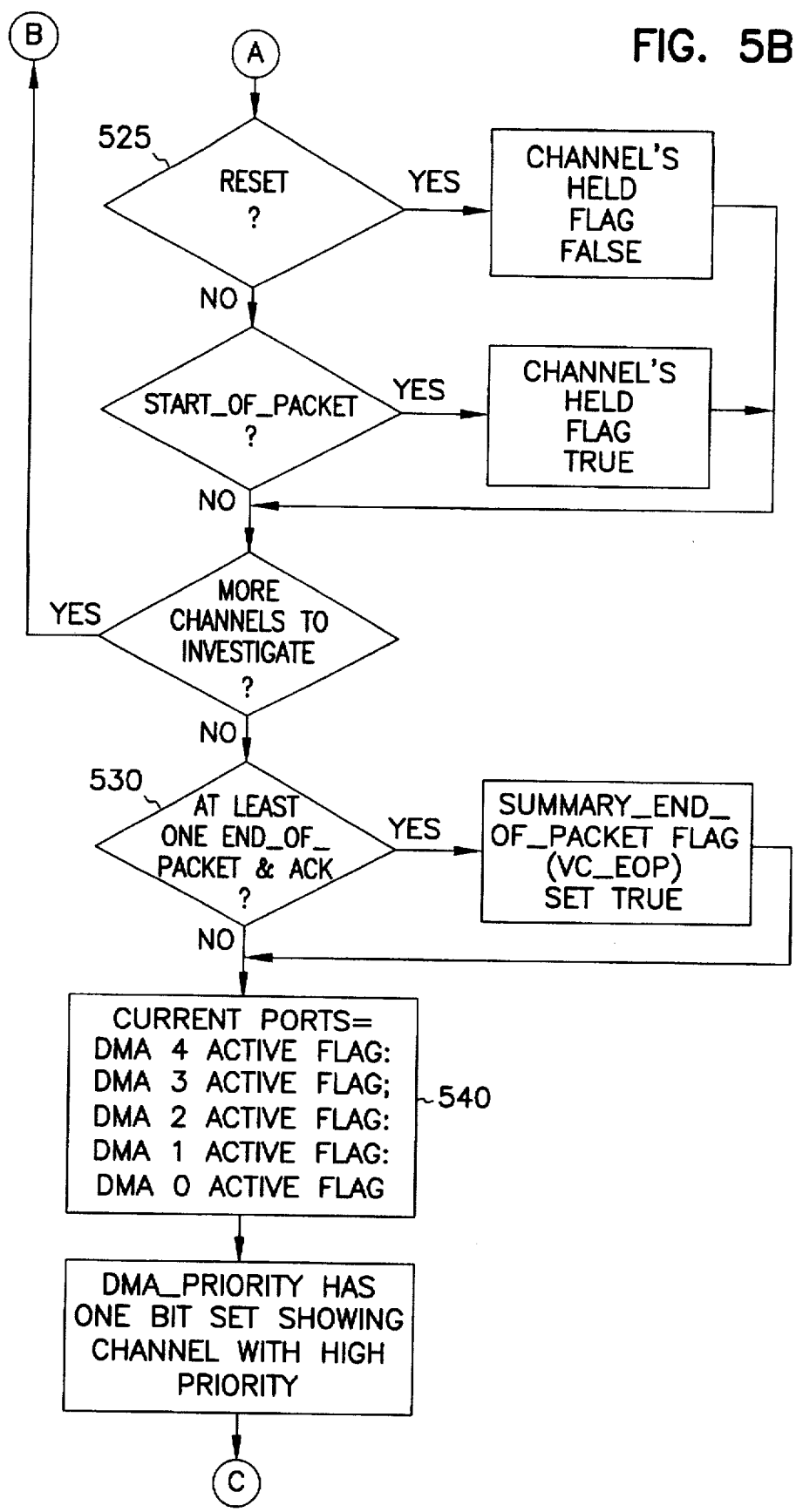
Figure 5C:
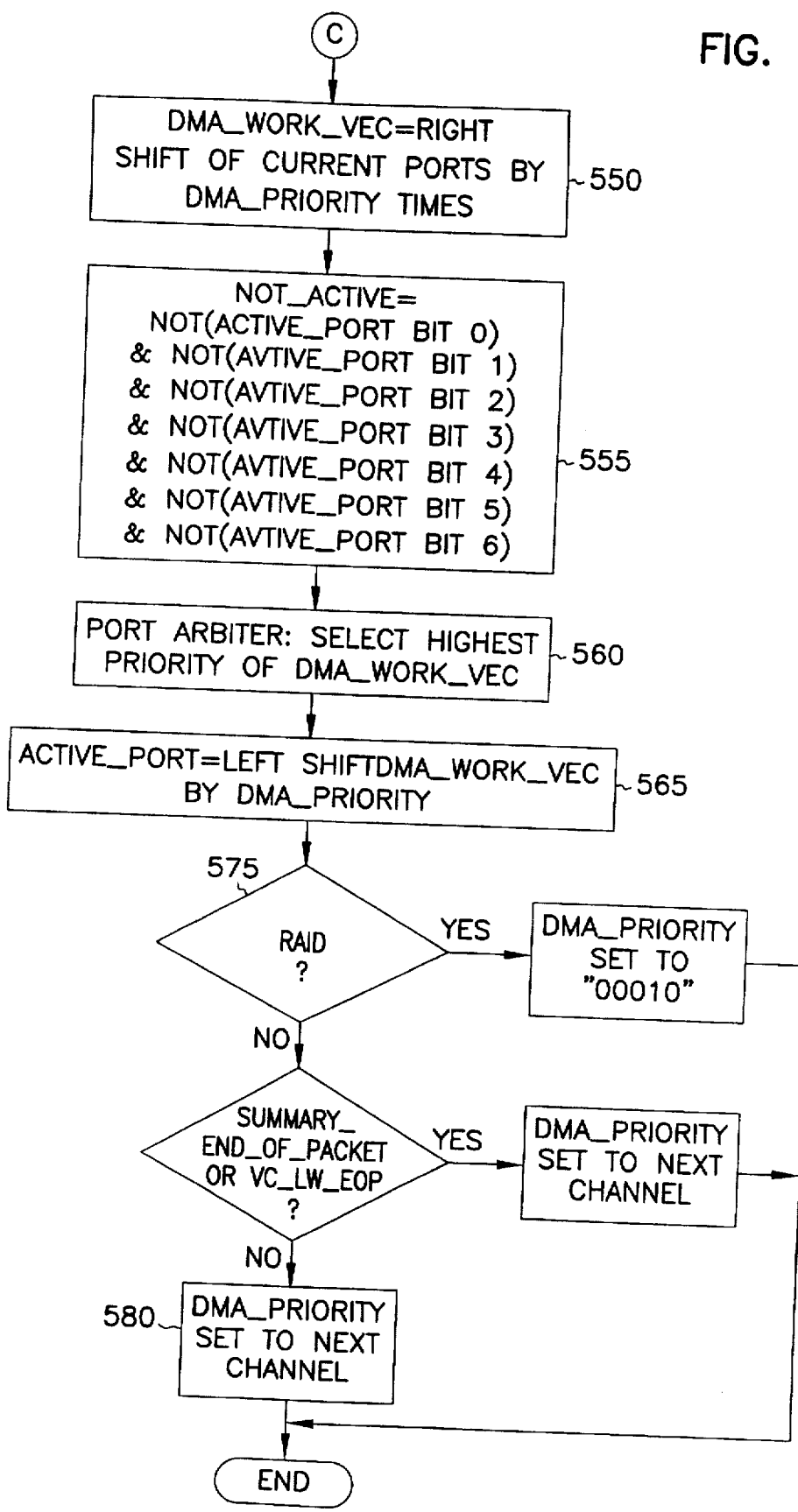

FIG. 5 is a flowchart illustrating the determination of which of several DMA packets should be given priority and dispatched. In one embodiment, this flowchart logic is implemented in the Verilog coding language. Port Arbitration module 480 determines priority with the use of 4 vectors: CURRENT_PORTS, DMA_PRIORITY, DMA_WORK_VEC, and ACTIVE_PORT. CURRENT_PORTS is a 5-bit vector which represents the current active DMA channels. Hence, if channels 0, 1 and 4 are active, CURRENT_PORTS is set as "10011". DMA_PRIORITY is a 5-bit vector which represents the DMA channel having the highest priority at any particular time. Only one bit in this vector is set at any one time. Hence, if channel 3 has priority, then the vector is set as "01000". This vector is left shifted (end around) when the end-of-packet signal is reached. DMA_WORK_VEC is a 5-bit vector which stores a temporary result. ACTIVE_PORT is a 7-bit vector that indicates the port which is active at any particular time. This vector's leftmost bit represents maintenance channel 496. The next bit represents message channel 430. The remaining 5 bits represent the DMA channels 360.0 through 360.4.

At step 505, arbitration module 480 decodes the START_OF_PACKET signals. Such a signal can be associated with any of the five DMA channels 360.0 through 360.4, the message channel 430 or the maintenance channel 496 and indicates when a channel has begun transmitting a packet. Next, at step 510, arbitration module 480 decodes the END_OF_PACKET signals. These signals are associated with the same channels as the start of packet signals are. For each of these seven channels 360.0 through 360.4, 430 and 496, at step 515 the channel's ACTIVE_FLAG status is set to FALSE if either the channel had an acknowledged END_OF_PACKET signal or if the channel had an END_OF_PACKET_HELD and that channel was the active channel. Otherwise, if the channel had a START_OF_PACKET signal, the ACTIVE_FLAG is set to TRUE.

At step 520, the END_OF_PACKET_HELD flag for the channel is set FALSE if that channel was active and already had the END_OF_PACKET_HELD flag set TRUE. Otherwise, if the channel had a unacknowledged END_OF_PACKET signal, then the END_OF_PACKET_HELD is set TRUE. If the system is reset, at step 525 the channel's HELD flag is cleared. Otherwise, if the channel has a START_OF_PACKET signal, the HELD flag is set TRUE.

If the END_OF_PACKET flag of one of the channels is set and acknowledged, then at step 530 the SUM_END_OF_PACKET flag is set TRUE. At step 540, port arbitration module 445 assigns the CURRENT_PORTS vector to be the concatenation of the active flags from the five DMA channels. For example, if channels 0 and 1 are active, then CURRENT_PORTS is set to "00011". In the next step, 550, CURRENT_PORTS is shifted to the right according to the DMA_PRIORITY vector by the RS subroutine in order to obtain the temporary vector DMA_WORK_VEC. DMA_PRIORITY, which is used by the RS subroutine is a 5-bit vector representing the DMA channel to be given the highest priority. For instance, if DMA channel 2 has priority then DMA_PRIORITY is "00100" and the RS subroutine will shift CURRENT_PORTS to the right by two bits. Another subroutine, LS, works similarly shifting data to the left.

At step 555, all of the bits in the ACTIVE_PORT vector are negated and ANDed together to set the NOT_ACTIVE flag. At step 560, the port arbiter section of the code selects the highest priority of the DMA_WORK_VEC. At step 565, using the LS routine, the DMA_WORK_VEC is left shifted by DMA_PRIORITY again to recover the actual port to be selected and assigned as the ACTIVE_PORT vector. The purpose of the RS/LS subroutines is to put the most recently used port in a position of least priority. The selection of the ACTIVE_PORT takes place in just one clock cycle.

If the RAID option is actuated, then DMA Channel 1 is always given priority and so in step 575, DMA_PRIORITY is set as "00010". Otherwise in step 580, if the SUM_END_OF_PACKET or VC_LW_EOP flag is TRUE, then the next higher channel is given priority by setting its bit in DMA_PRIORITY, else the same channel keeps the high priority to itself.

The benefits of port arbitration logic is that port arbitration 480 determines the active port in one clock period. Without this described approach, multiple clock periods would be needed to correctly determine the active port.

As an example, suppose that at a given point, the following packets are ready to be dispatched to the network and must therefore be processed by the port arbitration logic:

Packet A: DMA packet from DMA Engine 0
Packet B: Express packet
Packet C: DMA packet from DMA Engine 3
Packet D: DMA packet from DMA Engine 4
Packet E: Message packet.

Express packets receive the highest priority. Therefore, Packet B is dispatched first. Then Packet E is dispatched since non-DMA packets have the next highest priority. The remaining packets (A, C, and D) all originate from DMA engines and must compete for priority. Suppose that DMA channel 1 currently has priority. There are no packets to be dispatched for DMA channel 1 and therefore, the next highest channel with a packet should be given priority. Packet C, from DMA channel 3 is dispatched. Channel 3's priority is then minimized and the next higher channel is given priority. Packet D from channel 4 is dispatched. Finally, Packet A from channel 0 is dispatched.

Other embodiments of the client interface are possible without departing from the scope and spirit of the present invention. Other embodiments of this invention include a configuration allowing implementing additional DMA engines and DMA buffers for a larger number of DMA channels.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

We claim:

1. In a computer network having a plurality of client nodes, a client interface device, comprising:
   a plurality of channels, comprising:
   a network channel for dispatching data packets to and receiving data packets from the computer network;
   a plurality of DMA channels, each of the plurality of DMA channels connected to a pair of DMA registers;
   an express channel connected to an express register;
   a maintenance channel connected to a maintenance responder;
   a message input channel connected to a plurality of message registers;
   a message output channel connected to a plurality of message registers;
   a plurality of general registers;
   packet routing logic connected to a plurality of virtual input buffers, said packet routing logic having means for interpreting header information from network data packets and means for routing packets to one of the plurality of channels based on the header information; and
   channel arbitration logic, having means for accepting data packets from the plurality of channels and means for prioritizing data packets from the plurality of channels.

2. The client interface as recited in claim 1, further comprising a RAID controller connected to the plurality of DMA registers and the channel arbitration logic, providing I/O protocol for a Redundant Array of Inexpensive Disks system.

3. A method for arbitrating packetized data on a computer system having a plurality of client interfaces, including a first client interface, connected across a network, said client interface having a plurality of DMA channels connected to a plurality of peripherals, and said client interface having a single network channel over which packetized data must be arbitrated, the method comprising the steps of:
   defining an active-channel vector, indicating the DMA channel of the plurality of DMA channels using the network channel;
   receiving a plurality of data packets from the plurality of DMA channels;
   defining a current-packets vector based on the plurality of data packets from the channels;
   defining a channel-priority vector, indicating which of the plurality of DMA channels is to be given highest priority;
   performing a right-shift on the current-packets vector to create an arbitration vector;
   selecting a high-priority bit from the arbitration vector;
   performing a left-shift on the arbitration vector to place the most recently used DMA channel in a position of least priority; and
   changing the active-channel vector to indicate the DMA channel given use of the network channel based upon the arbitration vector.

4. A system for arbitrating packetized data on a computer system having a plurality of client interfaces, including a first client interface, connected across a network, comprising:
   a plurality of channels;
   a network channel connecting the client interface to the network;
   a port arbitrator to fairly dispatch the packetized data from the plurality of channels to the network via the network channel;
   wherein the port arbitrator comprises:
   an active-channel vector, indicating the channel using the network channel;
   data packet receivers to receive packetized data from the channels;
   a current-packets vector based on the plurality of data packets from the channels;
   a channel-priority vector, indicating which of the DMA channels is to be given highest priority;
   a rightwise shifter, which bit shifts the current-packets vector to the right to create an arbitration vector;
   a high-priority selector which selects a bit from the arbitration vector; and
   a leftwise shifter, which bit shifts the arbitration vector to the left to place the most recently used channel in a position of least priority.

* * * * *